United States Patent [19]
Beck et al.

[11] 3,857,862
[45] Dec. 31, 1974

[54] SUBSTITUTED BENZONITRILES

[75] Inventors: James R. Beck, Indianapolis; Robert G. Suhr, Greenfield, both of Ind.

[73] Assignee: Eli Lilly and Company, Indianapolis, Ind.

[22] Filed: Nov. 23, 1973

[21] Appl. No.: 418,540

[52] U.S. Cl............ 260/347.2, 260/347.8, 260/465, 424/285
[51] Int. Cl. ........................... C07d 5/04, C07d 5/16
[58] Field of Search...................... 260/347.2, 347.8

Primary Examiner—Norma S. Milestone
Assistant Examiner—Mildred A. Crowder
Attorney, Agent, or Firm—Dwight E. Morrison; Everet F. Smith

[57] ABSTRACT

There are disclosed novel 2,6-disubstituted benzonitriles prepared from 2,6-dinitrobenzonitriles via the nitro displacement reaction. Replacement of one or both of the nitro groups yields compounds possessing antiprotozoal, antifungal, and antibacterial properties.

7 Claims, No Drawings

SUBSTITUTED BENZONITRILES

BACKGROUND OF THE INVENTION

1. Field of the Invention

This invention relates generally to 2,6-disubstituted benzonitriles prepared from 2,6-dinitrobenzonitriles, 2-halo-6-nitrobenzonitriles, or 2-alkoxy-6-nitrobenzonitriles. The preparation is carried out by displacement of the nitro groups by a nucleophile under basic conditions. The nucleophiles can be alkoxide anions or thioxide anions.

2. Description of the Prior Art

In the prior art, the nucleophilic lability of activated nitro groups has been described by Bunnett et al., *J. Am. Chem. Soc.*, 79, 385 (1957), and by Bolto et al., *Australian J. Chem.*, 9, 74 (1956).

There are numerous examples in the chemical literature of activated nitro displacements in substituted benzenes, although most cases involve intramolecular displacement. See for example, T. W. M. Spence and G. Tennant, *J. Chem Soc., Perkin Trans.*, 1, 835 (1972).

An example of an intermolecular displacement is provided by the synthesis of 2,6-dimethoxybenzonitrile from m-dinitrobenzene, as reported by A. Russell et al., "Organic Syntheses," Coll. Vol. III, p. 293 (John Wiley and Sons, Inc., New York, N.Y., 1955). The preparation is accomplished in two steps. First, the m-dinitrobenzene is dissolved in methanol and allowed to react with potassium cyanide. In the second step, the 2-nitro-6-methoxybenzonitrile obtained in the first step is refluxed with a solution of potassium hydroxide in methanol to yield 2,6-dimethoxybenzonitrile in 15–17 percent overall yield. These authors teach no utility for the compound.

SUMMARY OF THE INVENTION

This invention relates to novel 2,6-disubstituted benzonitriles prepared by displacement of the nitro groups of 2,6-dinitrobenzonitriles, 2-halo-6-nitrobenzonitriles, or 2-alkoxy-6-nitrobenzonitriles. The compounds produced thereby are active as antiprotozoal, antifungal, and antibacterial agents.

DESCRIPTION OF THE PREFERRED EMBODIMENT

The novel compounds of this invention are of a class having the formula

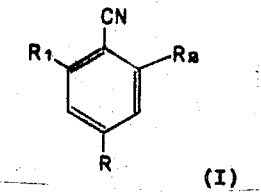

(I)

wherein
R is hydrogen or trifluoromethyl;
$R^1$ is halo, nitro, $C_1$–$C_3$ alkoxy, furfurylthio, furfuryloxy, tetrahydrofurfuryloxy, or tetrahydrofurfurylthio;
$R^2$ is furfuryloxy, furfurylthio, tetrahydrofurfuryloxy, or tetrahydrofurfurylthio.

Halo represents chlorine, bromine, or fluorine.

$C_1$–$C_3$ Alkoxy represents methoxy, ethoxy, n-propoxy, or isopropoxy.

The novel compounds coming within the scope of the generic formula, supra, possess activity variously as antiprotozoal, antifungal, and antibacterial agents.

Thus, the compounds are active in vitro against *Ochromonas malhamensis* at 40 mcg./6.25 mm. disc.

Most of the compounds have also shown antiprotozoal activity in vitro against *T. vaginalis* and *T. pyriformis* at 40 mcg./6.25 mm. disc.

Several of the compounds are active in vitro an antibacterial agents against *Staphylococcus aureus* 3055, and as antifungal agents against *Botrytis cinerea*, and *Trichophyton mentagrophytes*, at rates of about 10 to 100 mcg./ml.

The novel compounds are prepared starting with an intermediate compound of the formula

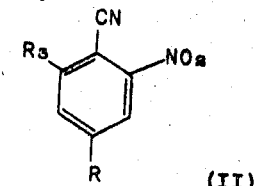

(II)

wherein R has the same significance as previously set forth, and $R^3$ is $C_1$–$C_3$ alkoxy, halo, or nitro. Those intermediate compounds of generic formula II wherein $R^3$ is nitro are readily prepared by the procedure of Beck, *J. Org. Chem.*, 37, 3224–3226 (1972). Again referring to generic formula II, when R is hydrogen and $R^3$ is chloro, the compound, 2-chloro-6-nitrobenzonitrile, is commercially available. The compound of generic formula II wherein R is hydrogen and $R^3$ is bromo is readily prepared according to the procedure of British Pat. No. 938,199 (1963), C.A. 60, 2864 (1964).

Those intermediate compounds of generic formula II wherein R is trifluoromethyl and $R^3$ is halogen, for example chloro, can be prepared as follows. Into a warm solution of α,α,α-trifluoro-2,6-dinitro-p-tolunitrile in dimethylformamide is bubbled anhydrous hydrogen chloride. An exothermic reaction occurs at about 100°C. The mixture is heated so it refluxes for about 10 minutes and is then poured into ice water. The solid is filtered off and is recrystallized from a mixture of ethanol and water to yield product having a melting point of about 52–53°C., and identified as 2-chloro-α,α,α-trifluoro-6-nitro-p-tolunitrile.

The intermediate compounds of generic formula II wherein $R^3$ is $C_1$–$C_3$ alkoxy are readily prepared from the 2,6-dinitrobenzonitriles of Beck, supra by reaction in the cold with an alkanol, for example methanol, in the presence of a suitable base, such as sodium methoxide, to yield the 2-alkoxy-6-nitrobenzonitrile, in this example, 2-methoxy-6-nitrobenzonitrile, or 2-methoxy-6-nitro-α,α,α-trifluoro-p-tolunitrile.

The novel compounds of this invention are prepared by allowing the intermediate compounds described above to react with a nucleophile selected from the group consisting of furfuryl mercaptan, furfuryl alcohol, tetrahydrofurfuryl mercaptan, and tetrahydrofurfuryl alcohol, in the presence of a suitable base. The reaction is carried out in a suitable solvent such as dimethylformamide, methanol, aqueous dimethylformamide, a mixture of methanol and dimethylformamide, and the like. Suitable bases include sodium hydroxide, lithium hydroxide, or potassium hydroxide, as well as sodium carbonate or potassium carbonate. The reaction is run at a reaction temperature within the range of from about 0°C. to about ambient room temperature. The reaction time varies from about an hour to about 5 or 6 hours, preferably about 3 hours.

Thus, the reaction is carried out by suspending or dissolving one of the intermediate compounds described above, for example, α,α,α-trifluoro-2,6-dinitro-p-tolunitrile, in a suitable solvent, such as dimethylformamide, together with a base, for example, potassium hydroxide, and a nucleophile, for example, furfuryl mercaptan. The resulting mixture is stirred at about ambient room temperature for a time sufficient to allow substantial completion of the displacement reaction, in the instant example, about 3 hours. The reaction product mixture is worked up by pouring it into a stirred mixture of ice and water. The solid which precipitates is filtered off and purified by recrystallization from a suitable solvent, for example, commercial 95 percent ethanol. The crystalline product obtained using the instant reactants is identified by elemental analyses and NMR spectrum as α,α,α-trifluoro-2-(furfurylthio)-6-nitro-p-tolunitrile.

As will be apparent to those skilled in the art, replacement of both nitro groups of 2,6-dinitrobenzonitrile can be readily accomplished by suitably adjusting the reaction conditions under which the nitro displacement reaction is run. One modification is the use of a large excess of the nucleophile so that both nitro groups are displaced by the same nucleophile.

Such displacement will require a longer period of reaction, suitably five to six hours, and will be aided by conducting the reaction at ambient room temperature. Of course, presence of base is required as in the single displacements discussed hereinabove.

Another method of displacing both nitro groups is by the stepwise displacement thereof. In this procedure, one nitro group is displaced by a first nucleophile following the procedure already outlined. The second nitro group is then displaced by reaction with another and different nucleophile, which, in addition, may also replace the first nucleophile. It is thus possible to obtain ortho disubstituted benzonitriles in which each substituent ortho to the cyano group is different, as well as ortho disubstituted benzonitriles in which the substituents ortho to the cyano group are the same.

This stepwise method can also be illustrated by the preparation of a compound such as α,α,α-trifluoro-2,6-bis(furfurylthio)-p-tolunitrile. In the preparation of this compound, α,α,α-trifluoro-2,6-dinitro-p-tolunitrile is allowed to react with sodium methyl sulfinate under the usual conditions described hereinabove to yield α,α,α-trifluoro-2-(methylsulfonyl)-6-nitro-p-tolunitrile. This latter compound in turn is allowed to react with furfuryl mercaptan at room temperature in a suitable solvent, such as dimethylformamide, in the presence of a base, such as potassium hydroxide, for about 3 hours. An excess of furfuryl mercaptan is then added to the reaction mixture and the reaction allowed to continue at ambient room temperature for about another hour. There is isolated in the usual manner a crystalline product which is identified as α,α,α-trifluoro-2,6-bis(furfurylthio)-p-tolunitrile, through the use of elemental analyses and NMR spectrum.

The reaction process followed in the preparation of compounds wherein $R^3$ in the generic formula (II) supra, is halo, is similar to that where $R^3$ is alkoxy. For example, a mixture of the commercially-available 2-chloro-6-nitrobenzonitrile and furfuryl mercaptan, in a suitable solvent such as dimethylformamide, together with a base, such as potassium hydroxide pellets, is prepared. The reaction mixture is stirred at about ambient room temperature for a suitable time, that is, about 3 hours. The reaction product mixture is worked up in the same manner as described hereinabove to yield 2-chloro-6-(furfurylthio)benzonitrile, identified by elemental analyses and NMR spectrum.

The following examples are illustrative of the invention but are not to be considered as limiting thereof.

EXAMPLE 1

α,α,α-Trifluoro-2-(furfurylthio)-6-methoxy-p-tolunitrile

The principal starting material for the title compound of this example was prepared in the following manner:

To a cold solution of 52.0 g. of α,α,α-trifluoro-2,6-dinitro-p-tolunitrile, in 500 ml. of absolute methanol, was added dropwise with stirring a solution of 11.0 g. of sodium methoxide in 200 ml. of absolute methanol. When addition was complete, the reaction product mixture was immediately poured into a mixture of ice and water. The solid material which precipitated was filtered off and recrystallized from a mixture of methanol and water to yield 39 g. of product having a melting point of about 72°-74°C. The product was identified by elemental analyses and NMR spectrum as α,α,α-trifluoro-2-methoxy-6-nitro-p-tolunitrile.

A mixture of 2.6 g. of α,α,α-trifluoro-2-methoxy-6-nitro-p-tolunitrile, prepared above, 1.15 g. of furfuryl mercaptan, and 0.7 g. of solid potassium hydroxide, in 100 ml. of dimethylformamide, was stirred at ambient room temperature for about three hours. At the end of that time, the reaction product mixture was poured into a mixture of ice and water, with stirring. The solid material which separated was filtered off and the filtrate was discarded. The solid material was recrystallized from commercial 95 percent ethanol to yield a crystalline product identified by elemental analyses and NMR spectrum as α,α,α-trifluro-2-(furfurylthio)-6-methoxy-p-tolunitrile. This product had a melting point of about 77°-79°C.

Following the same general procedure and using appropriate starting materials, the following additional compounds were prepared:

α,α,α-Trifluoro-2-(furfurylthio)-6-nitro-p-tolunitrile, having a melting point of about 48°-50°C., identified by elemental analyses and NMR spectrum.

α,α,α-Trifluoro-2-nitro-6[(tetrahydrofurfuryl)oxy]-p-tolunitrile, having a melting point of about 101°-103°C., identified by elemental analyses and NMR spectrum.

α,α,α-Trifluoro-2-(furfuryloxy)-6-nitro-p-tolunitrile, having a melting point of about 90°-93°C., identified by elemental analyses and NMR spectrum.

EXAMPLE 2

2-Chloro-6-(furfurylthio)benzonitrile

A mixture of 3.5 g. of 2-chloro-6-nitrobenzonitrile, 1.8 g. of furfuryl mercaptan, and 1.1 g. of solid potassium hydroxide, in 100 ml. of dimethylformamide was stirred at ambient room temperature for about 3 hours. At the end of that time, the reaction product mixture was poured into a mixture of ice and water with stirring. The solid material which separated was filtered off and the filtrate was discarded. The solid material was recrystallized from commercial 95 percent ethanol to yield a crystalline product identified by elemental analyses and NMR spectrum as 2-chloro-6-(furfurylthio)-benzonitrile, having a melting point of about 71°-73°C.

EXAMPLE 3

α,α,α-Trifluoro-2,6-bis(furfurylthio)-p-tolunitrile

The principal starting material for the preparation of the above-identified compound was obtained in the following manner:

A mixture of 5.2 g. of α,α,α-trifluoro-2,6-dinitro-p-tolunitrile and 3.06 g. of sodium methyl sulfinate in 100 ml. of dimethylformamide was stirred at ambient room temperature for about 3 hours. At the end of that time, the reaction product mixture was poured into a mixture of ice and water, with stirring. The solid material which separated was filtered off and the filtrate was discarded. The solid material was recrystallized from a mixture of commercial 95 percent ethanol and acetonitrile to yield a crystalline product identified by elemental analyses and NMR spectrum as α,α,α-trifluoro-2-(methylsulfonyl)-6-nitro-p-tolunitrile. It had a melting point of about 165°-168°C. and weighed about 2.3 g.

To a mixture of 1.9 g. of the α,α,α-trifluoro-2-(methylsulfonyl)-6-nitro-p-tolunitrile, prepared above, 0.8 g. of furfuryl mercaptan, and 100 ml. of dimethylformamide was added a solution of 0.6 g. of potassium hydroxide in 10 ml. of water and the mixture was stirred at ambient room temperature for about 3 hours. An excess of furfuryl mercaptan was added and stirring continued for another hour. At the end of that time, the reaction product mixture was poured into a mixture of ice and water with stirring. The solid material which separated was filtered off and the filtrate was discarded. The solid material was recrystallized from commercial 95 percent ethanol to yield a crystalline product identified by elemental analyses and NMR spectrum as α,α,α-trifluoro-2,6-bis(furfurylthio)-p-tolunitrile, having a melting point of about 92°-94°C. and weighing about 0.7 g.

The novel compounds of this invention are active against a number of different kinds of organisms and thus are useful in many different ways.

The compounds which are antibacterial can be used as the active ingredient in disinfectant solutions used in washing down the walls of laboratories, or cleaning laboratory benches, equipment, glassware, or the like.

Others of the compounds which are antiprotozoal agents can be used to treat protozoal infections according to procedures well known to the art.

We claim:

1. A compound of the formula:

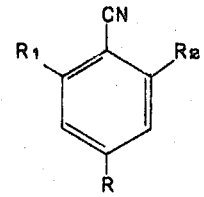

wherein
R is hydrogen or trifluoromethyl;
R¹ is halo, nitro, $C_1$-$C_3$ alkoxy, furfurylthio, furfuryloxy, tetrahydrofurfurylthio, or tetrahydrofurfuryloxy; and
R² is furfuryloxy, furfurylthio, tetrahydrofurfuryloxy, or tetrahydrofurfurylthio.

2. A compound as in claim 1, said compound being α,α,α-trifluoro-2-(furfurylthio)-6-methoxy-p-tolunitrile.

3. A compound as in claim 1, said compound being α,α,α-trifluoro-2-nitro-6-[(tetrahydrofurfuryl)oxy]-p-tolunitrile.

4. A compound as in claim 1, said compound being α,α,α-trifluoro-2-(furfuryloxy)-6-nitro-p-tolunitrile.

5. A compound as in claim 1, said compound being 2-chloro-6-(furfurylthio)benzonitrile.

6. A compound as in claim 1, said compound being α,α,α-trifluoro-2-(furfurylthio)-6-nitro-p-tolunitrile.

7. A compound as in claim 1, said compound being α,α,α-trifluoro-2,6-bis(furfurylthio)-p-tolunitrile.

* * * * *